Nov. 28, 1933.　　　P. M. MILLER　　　1,936,725
AUTOMOBILE WHEEL
Filed Dec. 9, 1930　　　2 Sheets-Sheet 1

Inventor
PHILIP M. MILLER
By Richey & Watts
Attorneys

Nov. 28, 1933.   P. M. MILLER   1,936,725
AUTOMOBILE WHEEL
Filed Dec. 9, 1930   2 Sheets-Sheet 2
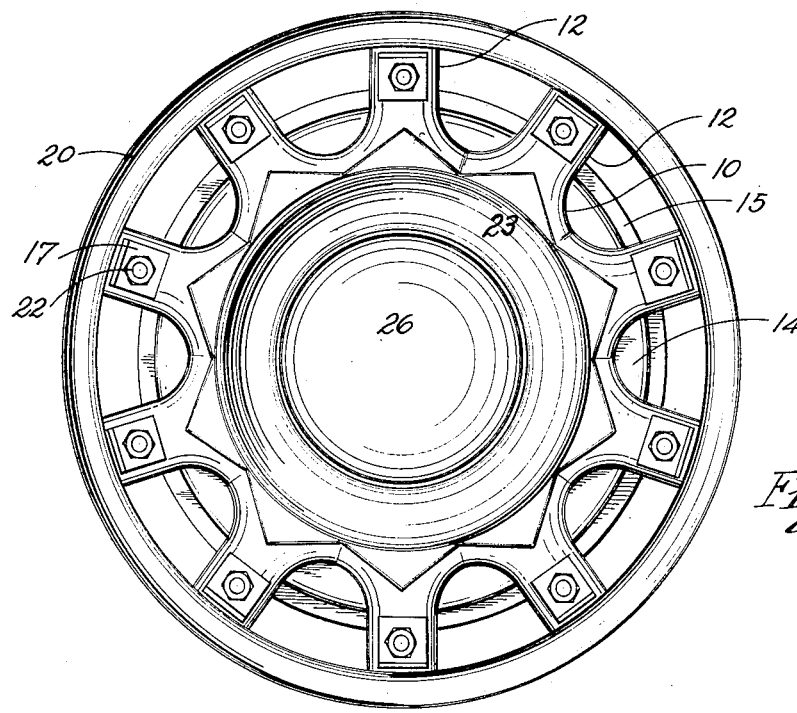
Fig.2
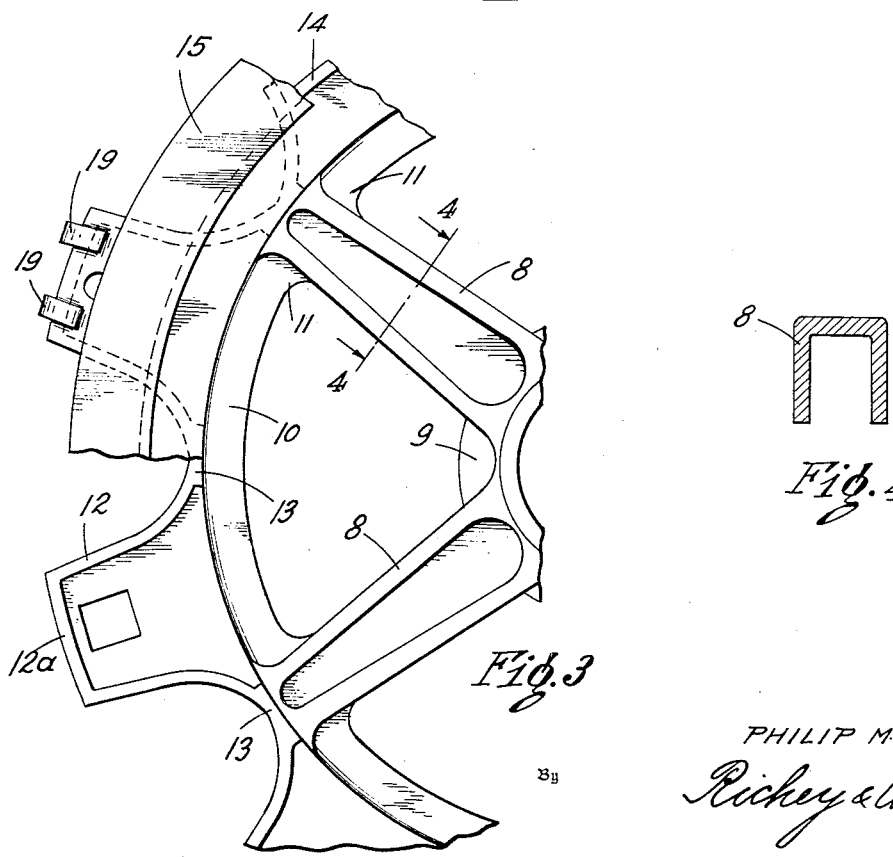
Fig.3
Fig.4
Inventor
PHILIP M. MILLER
Richey & Watts
Attorneys Patented Nov. 28, 1933

1,936,725

UNITED STATES PATENT OFFICE 1,936,725

AUTOMOBILE WHEEL

Philip M. Miller, Cleveland, Ohio, assignor to Miller Devices, Inc., a corporation of New York Application December 9, 1930. Serial No. 501,007

2 Claims. (Cl. 301—6)

This invention relates to wheels for motor vehicles of the cast metal spider type, and the primary object of the same is to provide a metal wheel assembly which simulates in general appearance the conventional wood spoke artillery wheel and includes a spider member that can be readily and economically cast as an integral unit and which together with the remaining parts of the assembly constitute a wheel which is relatively light yet strong and rugged, is self-ventilating when in service on the road and has symmetrical lines and an attractive appearance.

The foregoing and other objects and advantages will become apparent in view of the following description taken in conjunction with the drawings, wherein:

Fig. 2 is a view in outboard side elevation of the wheel of Fig. 1;

Fig. 3 is a fragmentary view in section and inboard side elevation of a portion of the wheel; and Fig. 4 is a view in section taken on the line 4—4, Fig. 3.

Figure 1:
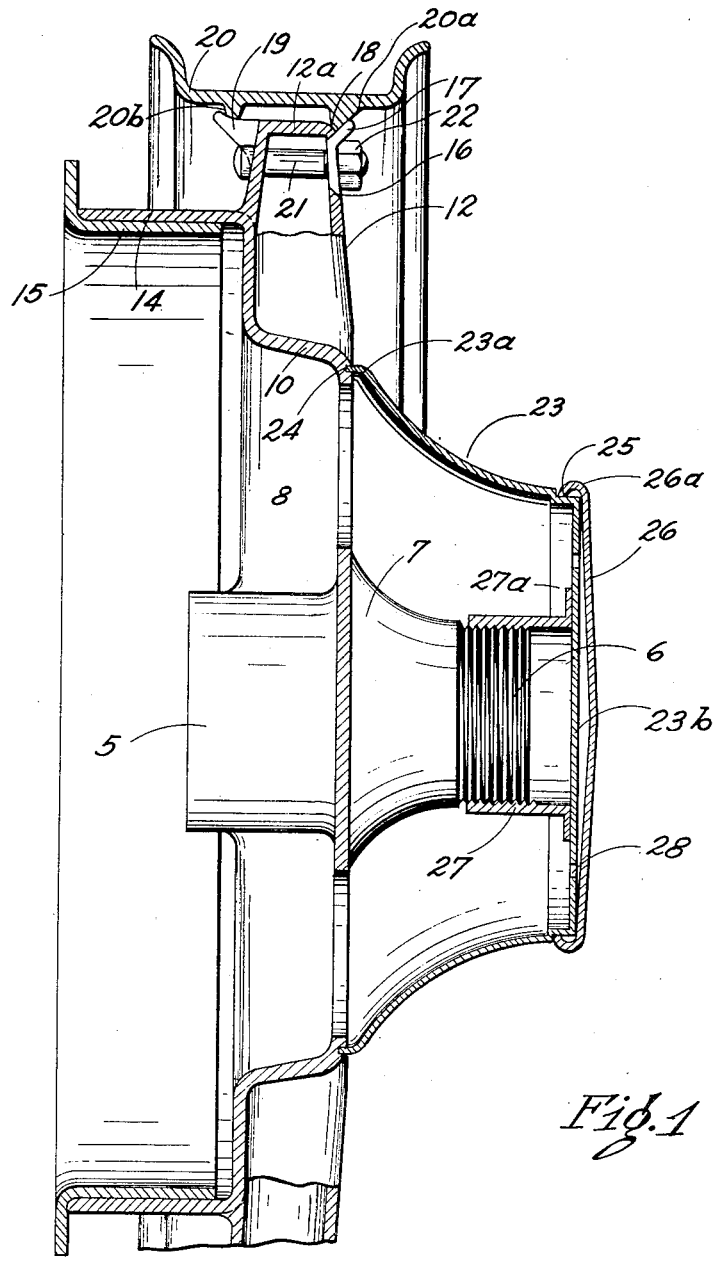
Figure 1 is a view in transverse vertical section, with parts broken away, of a wheel embodying the features of my invention.

The spider member of the wheel is preferably formed as an integral casting, and comprises a hub barrel generally indicated at 5 and formed with screw threads 6 at its outer end and a central reinforced portion 7. Extending radially from the barrel 5 are a plurality of ribs 8 which, as particularly shown in Figs. 3 and 4, are preferably of channel shape in cross section and extend transversely from the portion 7 of the hub barrel 5 laterally inwardly for such distance as will rigidly brace the spider against lateral stresses that may be imposed thereon during service on the road. By making the ribs channel shape in cross section, the side walls thereof can be made of substantially uniform thickness, and at the same time unnecessary metal can be dispensed with without sacrificing strength. It will also be seen that this channel construction facilitates casting at the foundry. As particularly shown in Fig. 3, fillets 9 are formed between the ribs 8 and brace the central portion of the spider against torque thrust. At their outer extremities, the ribs 8 merge with the annular spider wall, generally indicated at 10. The ribs are preferably of such extent as to form an open nave portion which extends for the greater diameter of the spider member. This open nave portion also materially reduces the weight of the wheel and provides a central ventilating chamber which will be more fully hereinafter referred to. At the point where the ribs 8 merge with the spider wall 10, fillets 11 are formed which reinforce the ribs and body wall at the point of the connection. The body wall 10 is formed with a plurality of relatively short radial projections 12 which define the spokes of the wheel and are bridged by a wall 12a. Between the projections 12, the said body wall is radially inwardly arched and formed with reinforcing pads 13, note Fig. 3. The inboard side of the wall 10 is formed with a flange 14 to provide a brake drum member. While this flange 14 could serve as a brake contacting member, yet I prefer to provide a separate contacting member 15 and secure the latter in the flange 14 in any well known manner. By this means the spider member may be cast of malleable metal, while the brake contacting member 15 may be formed as a separate unit of hard wear resisting metal, or metal of high carbon content.

It will be noted that the ribs 8 and spoke projections 12 are so arranged that, in effect, a cantilever structure is provided. In other words, the ribs 8 terminate in radial alinement with the pads 13, which pads lie at the base of the arched walls between the spokes. It will also be seen that each spoke is hollow and opens at its base into the open nave area of the wheel.

At their radial outer ends, the spoke projections 12 are formed with outboard side recesses 16 adapted to receive rim locking lugs 17. The bridge or end wall 12a of each spoke is tapered at its outboard side as at 18, while on the inboard side of the spoke projection 12, tapered lugs or bosses 19 are formed. The tapered portion 18 of the wall 12a, together with lugs or bosses 19, provide a wedging support for the tire rim, generally indicated at 20, which is formed with beads 20a and 20b which respectively engage said tapered portion 18 and bosses 19 when the rim is clamped in position by tightening the locking lugs or members 17. To lock the lugs 17 in position, each spoke projection 12 is transversely bored to receive locking bolts 21 which are provided with lock nuts 22. To mount the rim, it is only necessary to place the latter laterally in position on the spoke ends, then apply the lock lugs 17 on the bolts 21 and tighten the latter by means of the nuts 22, as is well understood in the art.

To prevent ingress of foreign matter into the open nave portion, a shell member 23 is provided, said member being of a diameter such as will cover the entire open outboard side of the spider. This shell member, as shown, has its edge 23a seated in an annular groove 24 formed in the outboard side of the spider member at the point where the ribs 8 merge with the wall 10. The shell 23 materially enhances the external appearance of the wheel, and with this in view it is preferred to arch the latter and otherwise ornament the same, and form it on lines which will render the wheel symmetrical in appearance. This shell member may be formed of thin sheet metal and chrome plated, or parts thereof may be painted while the remaining parts are chrome plated as will be understood. At its outboard extremity, the shell member is formed with an inset defining a shoulder 25 which is adapted to receive an end cap 26, the latter being provided with an inturned beaded edge 26a adapted for frictional engagement with the shoulder portion 25 of the shell 23. To provide a convenient form of grease retaining member for the end of the hub barrel, the shell 23 is provided with an annular, internally threaded member 27 formed with flanges 27a which are secured in any suitable manner such as by welding, to the end wall 23b of the shell 23. This end wall 23b is preferably formed with wrench sockets or recesses 28 to accommodate a suitable tool for mounting and demounting the shell relatively to the spider body.

It will be seen that when it is desired to gain access to the interior nave portion of the wheel, it is only necessary to pry off the shell cap 26 and then unthread the member 27 from the threads 6 on the end of the hub barrel 5, the shell being applied by reversing this operation. After the shell has been positioned with respect to the spider member, the shell 26 is pressed into frictional engagement with the shoulder portion 25 of the shell 23.

From the foregoing it will be seen that I have provided a wheel assembly embodying a spider member of cast metal having walls of substantially uniform thickness throughout and which is so designed that it may be readily and economically cast at the foundry with a minimum liability of casting strains and cracks commonly found in cast metal wheel structures. Due to the particular open type construction of the spider member, a relatively large open ventilating chamber is formed in the central portion of the wheel which is fully protected by the shell member 23, while at the same time the spokes open into said chamber and permit air to circulate through the spider structure and dissipate heat generated in the wheel during service on the road.

Having thus described my invention, I desire to secure by Letters Patent the following:

1. In a wheel for motor vehicles, a cast metal spider member of one-piece construction formed with a transversely extended hub barrel and a spider body having a wall of substantially uniform thickness throughout, ribs connecting said body with said hub barrel, said ribs being of a length such as to form an open nave portion for the greater diameter of the spider, said body wall being formed with a flange at the inboard side to provide a brake drum-member and arched peripherally and projected radially between each arch to define relatively short tapering spokes having free ends which are closed by an end wall, said ribs merging with said body wall at the base of each alternate arch to provide a cantilever construction and leaving the hollow spokes opening radially inwardly toward the nave portion, the casting operation being facilitated by the uniformly thick wall, and the hollow spokes and open nave portion serving also to facilitate casting and provide a light self-cooling construction, said spokes simulating the appearance of an artillery type wooden wheel, and a shell attached to the end of the hub barrel and flaring radially and covering the hollow nave portion of the spider.

2. In a wheel for motor vehicles, a cast metal spider member of one-piece construction formed with a transversely extended hub barrel and a spider body having a wall of substantially uniform thickness throughout, channel-shaped ribs connecting said body with said hub barrel and also having a substantially uniformly thick wall, said ribs being of a length such as to form an open nave portion for the greater diameter of the spider, said body wall being formed with a brake-drum flange at the inboard side thereof and arched peripherally and projected radially between each arch to define relatively short tapering artillery-type wheel spokes having free ends which are closed by an end wall, each of said channel-shaped ribs merging with said wall at the base of an arch to provide a cantilever construction and said arches being reinforced by a thickened bridge portion, the casting operation being facilitated by the uniformly thick body and rib walls, and the hollow spokes and open nave portion serving also to facilitate casting and provide a light, self-cooling construction, and a shell detachably secured to the end of the hub and flaring radially and seated in said body wall.

PHILIP M. MILLER.